(12) United States Patent
Nakata et al.

(10) Patent No.: US 7,557,947 B2
(45) Date of Patent: Jul. 7, 2009

(54) JOB EXECUTION DEVICE, METHOD FOR CONTROLLING THE DEVICE, IMAGE FORMING DEVICE AND COMPUTER PROGRAM PRODUCT

(75) Inventors: Hironobu Nakata, Itami (JP);
Masakazu Murakami, Itami (JP);
Kazumi Sawayanagi, Itami (JP);
Minako Kobayashi, Ikeda (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 889 days.

(21) Appl. No.: 11/024,813

(22) Filed: Dec. 30, 2004

(65) Prior Publication Data

US 2006/0077417 A1 Apr. 13, 2006

(30) Foreign Application Priority Data

Oct. 7, 2004 (JP) .............................. 2004-295447

(51) Int. Cl.
*G06F 3/12* (2006.01)
*G06K 15/00* (2006.01)

(52) U.S. Cl. ....................... 358/1.15; 358/1.18; 358/405

(58) Field of Classification Search ................ 358/1.15, 358/1.16, 1.14, 1.18, 404, 444, 405, 406, 358/435, 436, 437, 438, 439, 440
See application file for complete search history.

(56) References Cited

U.S. PATENT DOCUMENTS 5,414,494 A 5/1995 Aikens et al.
6,216,113 B1 4/2001 Aikens et al.
6,449,055 B1 * 9/2002 Okimoto et al. ............. 358/1.15
6,473,192 B1 * 10/2002 Kidani et al. ............... 358/1.14
6,985,257 B2 * 1/2006 Kidani et al. ................ 358/1.9
2002/0089693 A1 7/2002 Maruyama
2002/0101604 A1 * 8/2002 Mima et al. ................ 358/1.15

(Continued)

FOREIGN PATENT DOCUMENTS

CN 1095120 C 11/2002

(Continued)

OTHER PUBLICATIONS

Final Decision for Rejection for Japanese Patent Application No. 2004-295447, dated Jan. 23, 2007, and English translation.

(Continued)

*Primary Examiner*—Jerome Grant, II
(74) *Attorney, Agent, or Firm*—Buchanan Ingersoll & Rooney PC

(57) ABSTRACT

An image forming device executes a job of a process about an image in accordance with an instruction given by a user. The image forming device includes a job execution history table for storing cause information that indicates a cause for which a job could not be executed normally and user ID information of the user who instructed the job, a notification object determination portion for determining the job that could not be executed normally due to the cause in accordance with the cause information stored in the job execution history table, and an error cause removal notification portion for notifying the user indicated in the user ID information corresponding to the determined job that the cause for which the job could not be executed normally has been removed.

22 Claims, 17 Drawing Sheets

DB3

| JOB ID | USER ID | APPLICATION | EXECUTION RESULT | ABNORMAL FINISH CAUSE |
|---|---|---|---|---|
| J001 | 100 | PRINT | 0: NORMAL FINISH | 0: − |
| J002 | 101 | PRINT | 0: NORMAL FINISH | 0: − |
| J006 | 101 | SCAN | 1: ABNORMAL FINISH | 1: MALFUNCTION OF A DEVICE (TERMINAL DEVICE 2A) OF THE PARTY ON THE OTHER |
| J007 | 100 | COPY | 2: ABNORMAL FINISH | 2: ERROR OF A PHOTOSENSITIVE MEMBER |
| J008 | 103 | COPY | 3: ABNORMAL FINISH | 3: LACK OF THE DESIGNATED FONT |
| J009 | 109 | PRINT | 4: ABNORMAL FINISH | 4: MEMORY OVERFLOW ERROR |
| ⋮ | ⋮ | ⋮ | ⋮ | ⋮ |

U.S. PATENT DOCUMENTS

| | | | |
|---|---|---|---|
| 2003/0090697 A1* | 5/2003 | Lester et al. | 358/1.14 |
| 2003/0093710 A1 | 5/2003 | Hashimoto et al. | |
| 2003/0112472 A1 | 6/2003 | Eguchi et al. | |
| 2004/0125398 A1* | 7/2004 | Aiyama | 358/1.14 |
| 2005/0052699 A1* | 3/2005 | Goicoechea | 358/1.16 |
| 2005/0128512 A1* | 6/2005 | Kurotsu | 358/1.15 |
| 2005/0141023 A1* | 6/2005 | Yagita et al. | 358/1.15 |
| 2005/0289385 A1* | 12/2005 | Nakaya | 714/5 |
| 2006/0044590 A1* | 3/2006 | Ferlitsch et al. | 358/1.14 |
| 2006/0085567 A1* | 4/2006 | Takada et al. | 710/15 |
| 2006/0092433 A1* | 5/2006 | Stevens et al. | 358/1.1 |

FOREIGN PATENT DOCUMENTS

| | | |
|---|---|---|
| JP | 09-305334 A | 11/1997 |
| JP | 11-8727 A | 1/1999 |
| JP | 11-327854 A | 11/1999 |
| JP | 2000-099221 | 4/2000 |
| JP | 2002-123380 A | 4/2002 |
| JP | 2002-169683 A | 6/2002 |
| JP | 2002-196915 A | 7/2002 |
| JP | 2002-259100 A | 9/2002 |
| JP | 2002-297348 | 10/2002 |
| JP | 2002-366319 A | 12/2002 |
| JP | 2003-150359 A | 5/2003 |
| JP | 2003-189041 A | 7/2003 |
| WO | WO 9603692 | 2/1996 |

OTHER PUBLICATIONS

Notification of Reasons for Refusal for Japanese Patent Application No. 2004-295447, dated May 30, 2006, and English translation.

Chinese Office Action dated Aug. 22, 2008 for corresponding Chinese patent application No. 200510104090X.

English Language Translation of Chinese Office Action in Patent Application No. 200510104090.X dated Aug. 22, 2008.

\* cited by examiner

| USER ID | PASSWORD | ELECTRONIC MAIL ADDRESS |
|---|---|---|
| 100 | 45625 | sato@ ··· .co.jp |
| 101 | 37864 | suzuki@ ··· .co.jp |
| 102 | 95102 | tanaka@ ··· .co.jp |
| 103 | 75689 | fujita@ ··· .co.jp |
| 104 | 54984 | murata@ ··· .co.jp |
| ⋮ | ⋮ | ⋮ |

| JOB ID | USER ID | APPLICATION | JOB RECEPTION STATE | RECEPTION REFUSAL CAUSE |
|---|---|---|---|---|
| J001 | 100 | PRINT | 0: ACCEPTED | 0: – |
| J002 | 101 | PRINT | 0: ACCEPTED | 0: – |
| J003 | 107 | SCAN | 1: REFUSED | 1: LACK OF "BROADCASTING TRANSMISSION FUNCTION" |
| J004 | 105 | COPY | 1: REFUSED | 2: LACK OF "IMAGE ROTATION FUNCTION" |
| J005 | 102 | PRINT | 1: REFUSED | 3: LACK OF "CONFIDENTIAL PRINT FUNCTION" |
| J006 | 101 | SCAN | 0: ACCEPTED | 0: – |
| J007 | 100 | COPY | 0: ACCEPTED | 0: – |
| J008 | 103 | COPY | 0: ACCEPTED | 0: – |
| J009 | 109 | PRINT | 0: ACCEPTED | 0: – |
|  |  |  |  |  |

| JOB ID | USER ID | APPLICA-TION | EXECUTION RESULT | ABNORMAL FINISH CAUSE |
|---|---|---|---|---|
| J001 | 100 | PRINT | 0: NORMAL FINISH | 0: – |
| J002 | 101 | PRINT | 0: NORMAL FINISH | 0: – |
| J006 | 101 | SCAN | 1: ABNORMAL FINISH | 1: MALFUNCTION OF A DEVICE (TERMINAL DEVICE 2A) OF THE PARTY ON THE OTHER |
| J007 | 100 | COPY | 2: ABNORMAL FINISH | 2: ERROR OF A PHOTOSENSITIVE MEMBER |
| J008 | 103 | COPY | 3: ABNORMAL FINISH | 3: LACK OF THE DESIGNATED FONT |
| J009 | 109 | PRINT | 4: ABNORMAL FINISH | 4: MEMORY OVERFLOW ERROR |
| ⋮ | ⋮ | ⋮ | ⋮ | ⋮ |

JOB EXECUTION DEVICE, METHOD FOR CONTROLLING THE DEVICE, IMAGE FORMING DEVICE AND COMPUTER PROGRAM PRODUCT

This application is based on Japanese Patent Application No. 2004-295447 filed on Oct. 7, 2004, the contents of which are hereby incorporated by reference.

BACKGROUND OF THE INVENTION

1. Field of the Invention

The present invention relates to an image processor such as an MFP that can send data to a terminal device of a user via a network, and a method for controlling the same.

2. Description of the Prior Art

Recently, an image forming device called a multifunction device or an MFP (Multi Function Peripherals) having functions of a copier, a scanner, a fax, a network printer and a document server is becoming commonplace.

A user gives an instruction to the image forming device to perform a desired process usually by operating an operation panel of the image forming device. Then, the image forming device creates a job and registers it in a queue so that the execution of the process for the job is started when its turn comes. However, there is a case where the job cannot be executed because the image forming device is not equipped with a function necessary for executing the job or a malfunction has happened in hardware or software.

In this case, the image forming device abandons the job regarding that an error occurred. If the image forming device detects that the job cannot be performed when receiving the instruction for the job from the user, it refuses to register the job. Therefore, the user has to give the instruction again after the malfunction is resolved or the necessary function is added.

In order to improve facility of a user when an error occurred in the image forming device, some methods are proposed as follows. Japanese unexamined patent publication No. 2003-150359 discloses a method in which when detecting an abnormal condition that occurred in a device performing a job, an attribution of a user who issued the job is determined. Then, if a result indicating that the user who issued the job does not exist in the proximity is obtained, a person who exists in the proximity of the device is notified of information about occurrence of the abnormal condition. Japanese unexamined patent publication No. 2002-169683 discloses a method in which when an error occurred, all the jobs that can be affected by the error are determined in accordance with a type of the error. Devices that requested to execute the jobs are determined. Then, an error message is sent to the devices.

Japanese unexamined patent publication No. 11-327854 discloses a method in which when a print error occurred, the user who activated the current job is notified of the error. After that, when the error is recovered, all the registered users are notified of the recovery. Japanese unexamined patent publication No. 9-305334 discloses a method in which when an abnormal condition in a printer is detected, it is monitored whether or not the abnormal condition has been resolved after a predetermined time has passes from the detection. Then, if the abnormal condition has not been resolved, error information is sent to a host computer that sent print data that were under process when the abnormal condition was detected or to a host computer that sent print data before or after the time when the abnormal condition was detected.

In addition, various methods are proposed as below that are used for adding functions or changing settings in an image forming device. Japanese unexamined patent publication No. 2002-259100 discloses a method in which when setting of authorization for using a printing device is changed, the changed contents are sent to a user whose right for use was changed. Japanese unexamined patent publication No. 2002-196915 discloses a method in which device information is obtained from a printing device by regular polling or the like. If there is a change in a state of the printing device, a notice of the change is sent to an information processor by electronic mail.

Japanese unexamined patent publication No. 2002-123380 discloses a method in which if setting information of a printer is changed, the setting information after the change is automatically sent to a host computer. Japanese unexamined patent publication No. 2003-189041 discloses a method in which if setting of an Internet facsimile device is changed by remote access using electronic mail, the Internet facsimile device notifies a person who made the change about a result of the change and information of contents. Japanese unexamined patent publication No. 2002-366319 discloses a method in which an update process of software is automatically performed during a power save mode of a printing processor.

However, according to the conventional method, when a user tries to make the image forming device perform the abandoned job again, the job is not accepted and is abandoned again unless a cause of the error is not removed. Therefore, the user may repeat the instruction operation in vain. If the circumstance permits using a plurality of image forming devices, it would be possible to find and use another image forming device that can perform the job. In that case, however, it would be inconvenient if it is disposed at a distant place from the user. In addition, it would require time and effort to find another image forming device that can perform the job. Even if such an image forming device is found, there is a possibility that the image forming device becomes overloaded to affect other user or deteriorate process efficiency of the entire system.

Furthermore, the user has to check a state of hardware or software of the image forming device one by one before instructing the execution of the job. According to the method described in Japanese unexamined patent publication No. 2002-196915, when there is a change in a state of the printing device, a notice of the change is sent to an information processor by electronic mail. In this way, the user may know that a cause of an error has been removed. However, receiving electronic mail every time when a change happened in the printing device would be burdensome to a user because he or she has to check unnecessary information.

SUMMARY OF THE INVENTION

An object of the present invention is to provide a device and a method in which a user can know more easily than before about a timing of retrying a job that was not accepted due to a malfunction or a lack of function.

The job execution device according to an aspect of the present invention is a job execution device for executing a job for a predetermined process in accordance with an instruction given by a user. The job execution device includes a storage portion for storing a cause information that indicates a cause for which a job could not be executed normally and user ID information of the user who instructed the job, for each job, a determining portion for determining the job that could not be executed normally due to the cause in accordance with the cause information stored in the storage portion when it is detected that the cause is removed, and a notifying portion for notifying the user indicated in the user ID information corresponding to the determined job that the cause of the job has been removed.

The job execution device can be applied to an image forming device such as an MFP eligibly. In this case, it is structured as below. Namely, the image forming device includes a storage portion for storing malfunction cause information that indicates a cause of a malfunction and user ID information that indicates the user who instructed the job for each job that could not executed because the malfunction had happened, a detecting portion for detecting which cause of the malfunction was removed by detecting a change of state in the image forming device, a determining portion for determining the job that could not be executed normally due to the malfunction in accordance with the malfunction cause information stored in the storage portion when it is detected that the cause of the malfunction is removed, and a notifying portion for notifying a user indicated in the user ID information corresponding to the determined job that the cause of the malfunction was removed.

According to the present invention, a user can know more easily than before about a timing of retrying a job that was not accepted due to a malfunction or a lack of function.

BRIEF DESCRIPTION OF THE DRAWINGS

FIG. 5 shows an example of a user information database.

FIG. 6 shows an example of a job reception table.

FIG. 7 shows an example of a job execution history table.

DESCRIPTION OF THE PREFERRED EMBODIMENTS

Hereinafter, the present invention will be explained more in detail with reference to embodiments and drawings.

Figure 1:
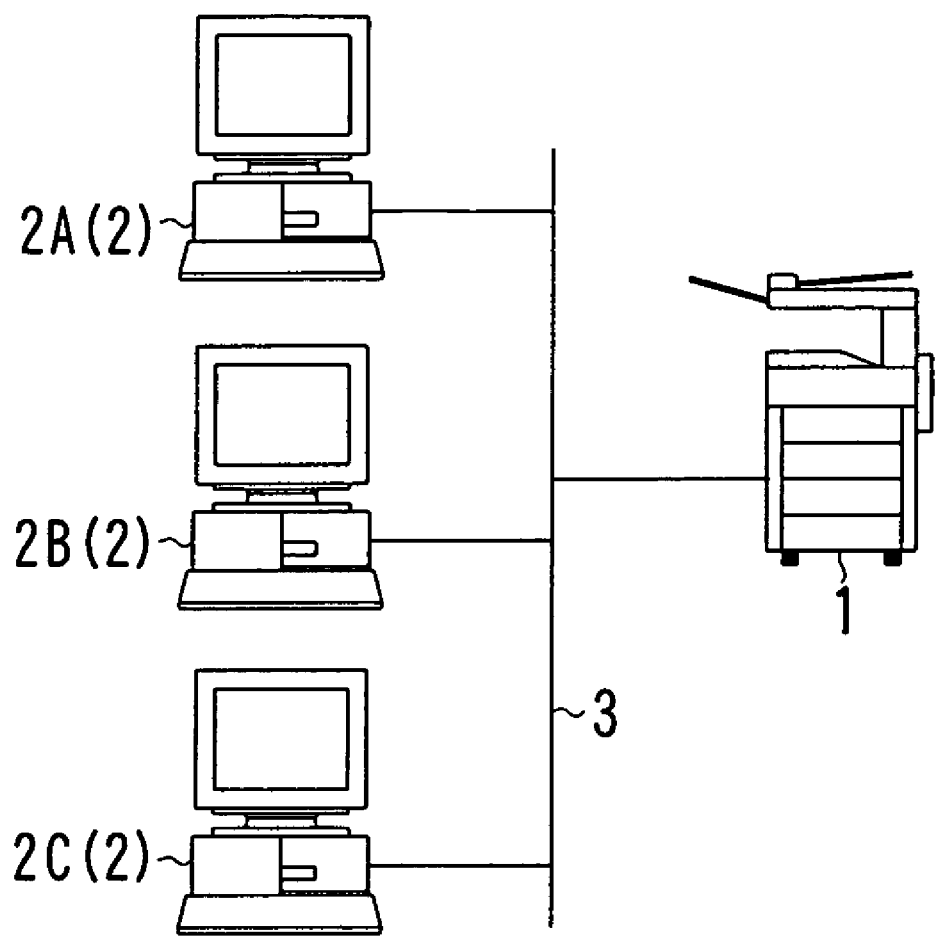
FIG. 1 shows an example of an overall structure of a network system that includes an image forming device according to the present invention.
Figure 2:
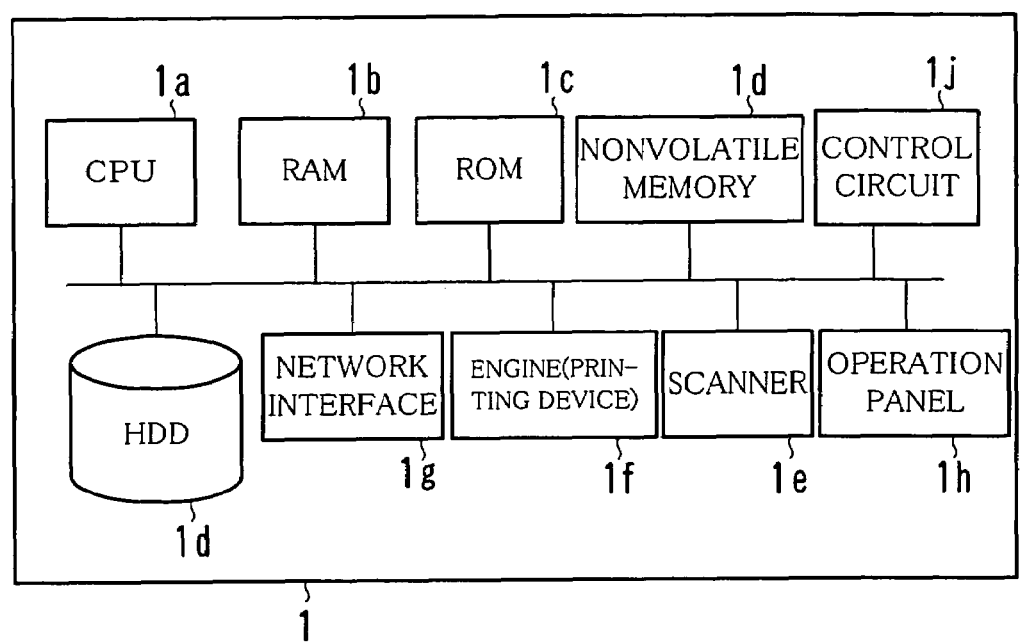
FIG. 2 shows an example of a hardware structure of the image forming device.
Figure 3:
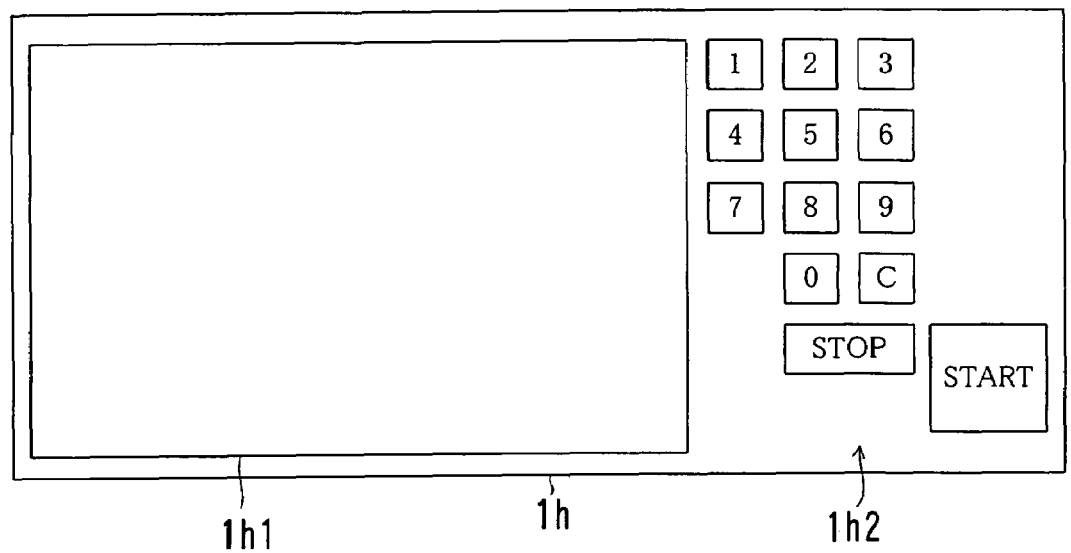
FIG. 3 shows an example of a structure of an operation panel.
Figure 4:
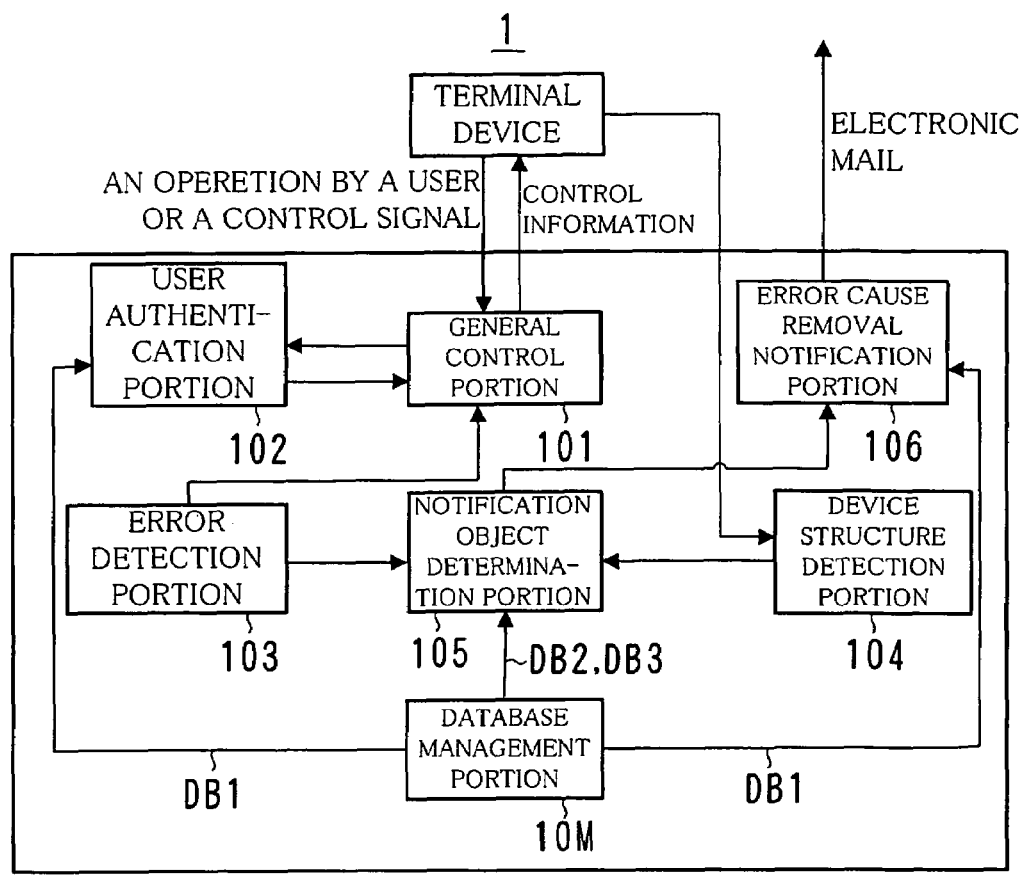
FIG. 4 shows an example of a functional structure of the image forming device.

FIG. 1 shows an example of a overall structure of a network system that includes an image forming device 1 according to the present invention, FIG. 2 shows an example of a hardware structure of the image forming device 1, FIG. 3 shows an example of a structure of an operation panel $1h$, FIG. 4 shows an example of a functional structure of the image forming device 1.

The image forming device 1 according to the present invention is connected to plural terminal devices 2 (2A, 2B, 2C, . . . ) via a communication line 3 as shown in FIG. 1. As the communication line 3, a LAN, the Internet, a public telephone line or a private line can be used. As a protocol, an FTP (File Transfer Protocol), a POP (Post Office Protocol) or an SMTP (Simple Mail Transfer Protocol) can be used.

The image forming device 1 is a device having integrated functions that include a copier, a network printer, a scanner, a fax and a document server. It is called a multifunction device or an MFP (Multi Function Peripherals). A function of the document server is also called a "box function" because it assigns a storage area called a "box" to each user. A new function can be installed in the image forming device 1 or an existing function thereof can be enhanced to be more useful by adding hardware or software.

As shown in FIG. 2, the image forming device 1 includes a CPU $1a$, a RAM $1b$, a ROM $1c$, a large capacity recording medium $1d$ such as a nonvolatile memory or a hard disk drive, a scanner $1e$, a printing device $1f$, a network interface $1g$, an operation panel $1h$ and a control circuit $1j$.

The scanner $1e$ is a device for reading images such as photographs, characters, pictures or charts on a sheet of paper of an original (hereinafter may be simply referred to as an "original") optically so as to generate image data. The printing device $1f$ is a device for printing an image read by the scanner $1e$ or an image of image data received from the terminal device 2. In this embodiment, an electrophotographic device (i.e., a laser printer) is used as the printing device $1f$.

The operation panel $1h$ includes a display device $1h1$ and an operating button unit $1h2$ including plural operating buttons as shown in FIG. 3.

The operating button unit $1h2$ includes plural keys for entering numbers, characters or symbols, a sensor for recognizing a pressed key and a transmission circuit for sending a signal indicating a recognized key to a CPU $1a$.

The display device $1h1$ displays a screen for giving a message or an instruction to a user who operates the image forming device 1, a screen for a user to enter items for setting or a process and a screen for showing an image formed in the image forming device 1 or a result of the process. In this embodiment, a touch panel is used as the display device $1h1$. Therefore, the display device $1h1$ has a function for detecting a position on the touch panel where a user touched with a finger and sending a signal that indicates a result of the detection to the CPU $1a$.

In this way, the operation panel $1h$ plays a role as a user interface for a user who operates the image forming device 1 directly. An application program and a driver for giving an instruction to the image forming device 1 are installed in the terminal device 2. Therefore, a user can use the terminal device 2 for controlling the image forming device 1 from a remote place.

The network interface $1g$ shown in FIG. 2 is a device for performing communication with the terminal device 2. As the network interface $1g$, an NIC (Network Interface Card), a modem or a TA (Terminal Adapter) can be used.

The control circuit $1j$ is a circuit for controlling devices including the large capacity recording medium $1d$, the scanner $1e$, the printing device if, the network interface $1g$ and the operation panel $1h$.

The large capacity recording medium $1d$ stores programs and data for realizing functions of a general control portion 101, a user authentication portion 102, an error detection portion 103, a device structure detection portion 104, a notification object determination portion 105, an error cause removal notification portion 106 and a database management portion 10M as shown in FIG. 4. These programs are executed by the CPU 1a. A part or the entire of the programs or data may be stored in the ROM 1c. Furthermore, it is possible to realize a part or the entire of the functions shown in FIG. 4 by the control circuit 1j.

As described above, the application program and the driver that support the image forming device 1 are installed in the terminal device 2. In addition, an application program for electronic mail and an application program for file transmission are installed in the same. As the terminal device 2, a personal computer, a workstation or a PDA (Personal Digital Assistant) can be used.

Figure 8:
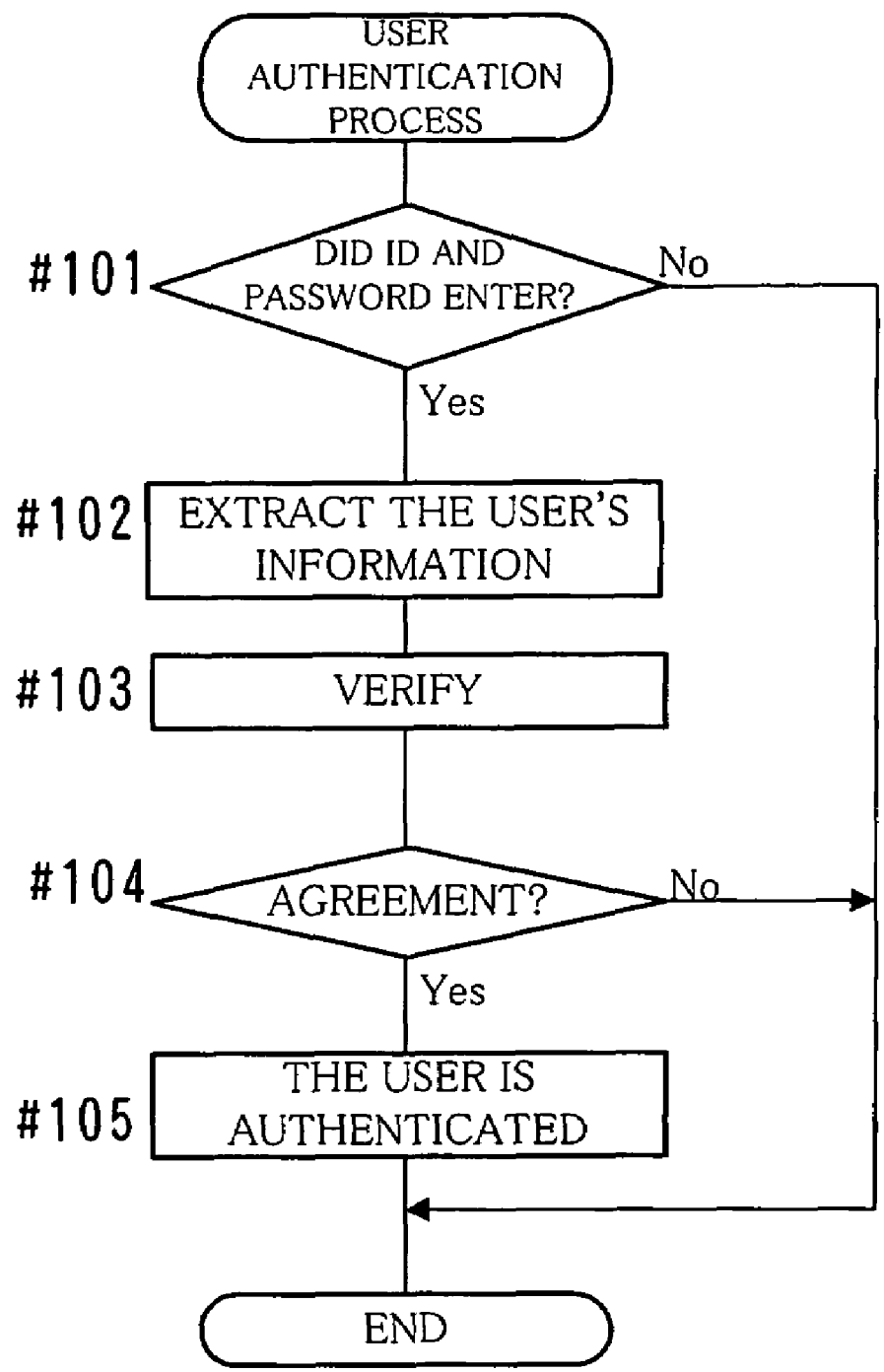
FIG. 8 is a flowchart showing an example of a flow of a user authentication process.
Figure 9:
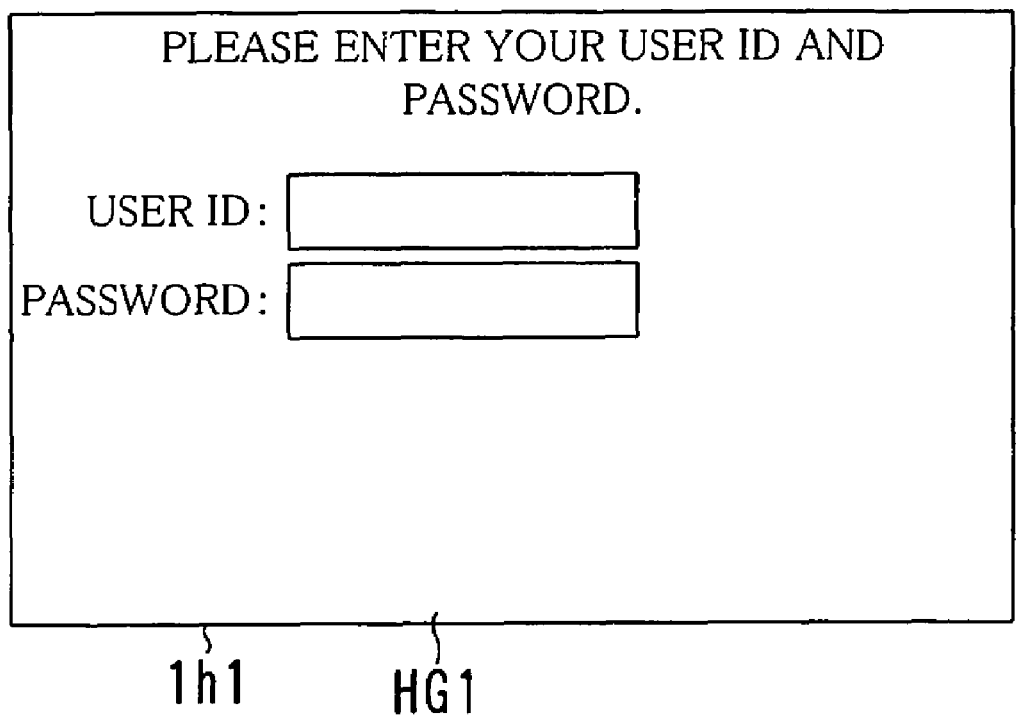
FIG. 9 shows an example of a log-in screen.
Figure 10:
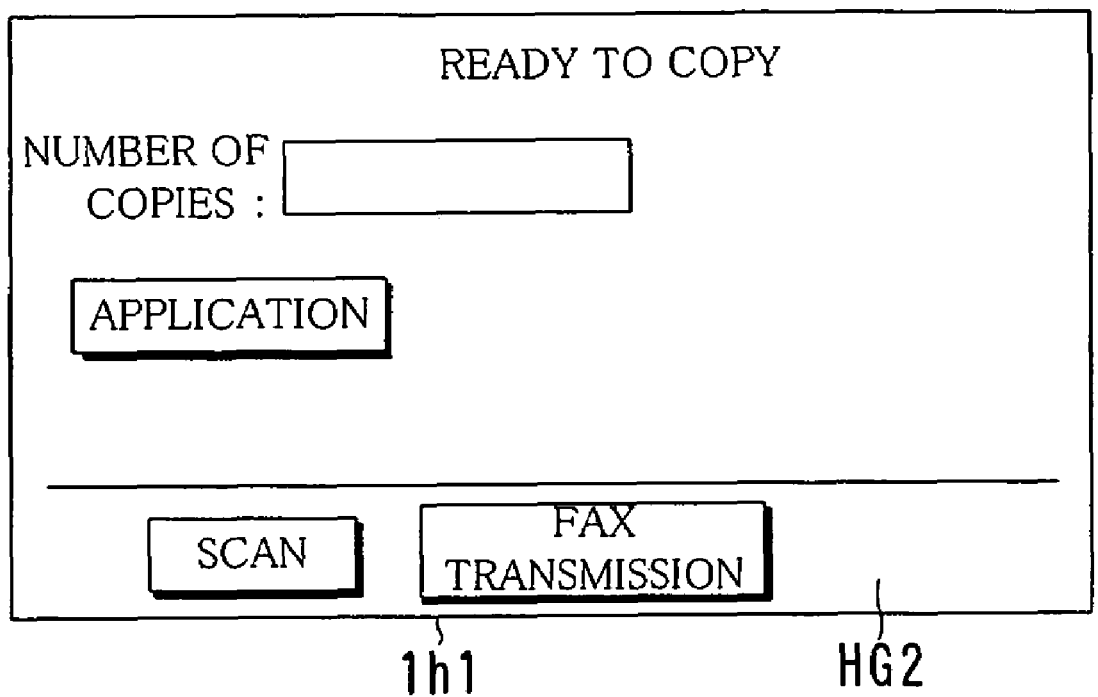
FIG. 10 shows an example of a copy job reception screen.
Figure 11:
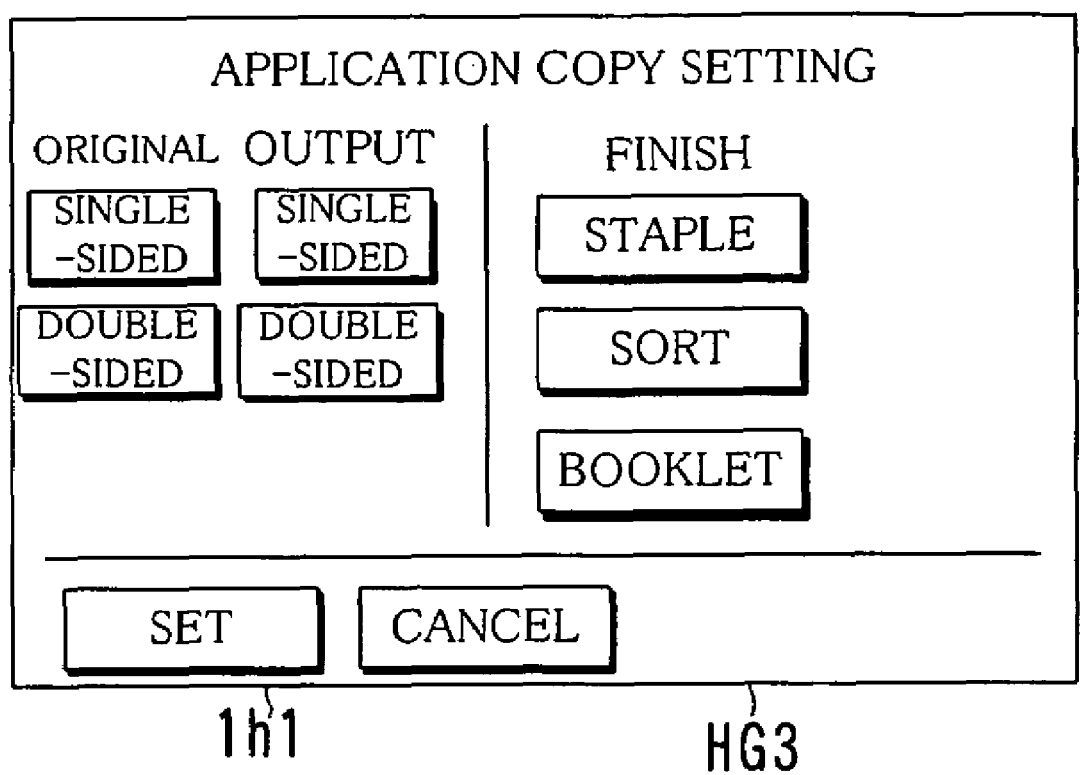
FIG. 11 shows an example of an application copy setting screen.
Figure 12:
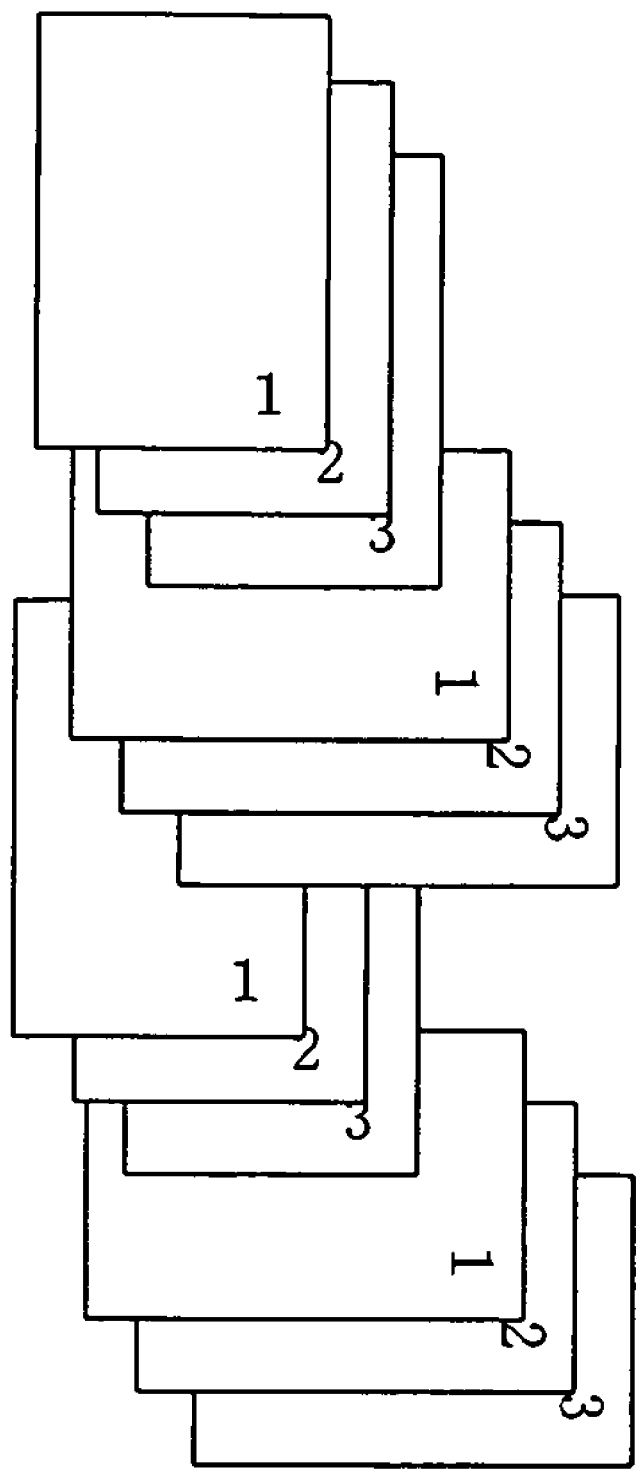
FIG. 12 shows an example of an alternate sort.
Figure 13:
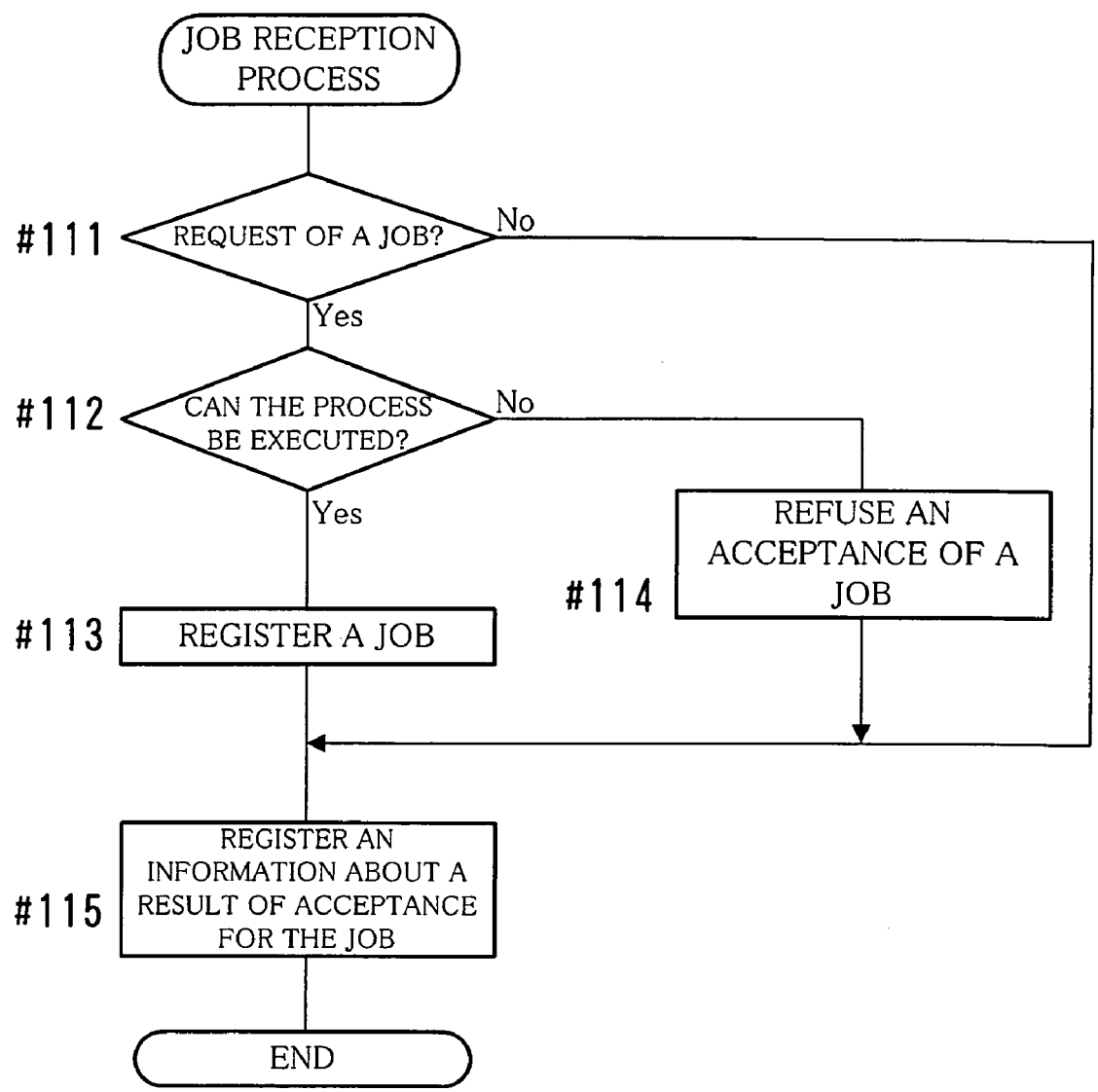
FIG. 13 is a flowchart showing an example of a flow of a job reception process.
Figure 14:
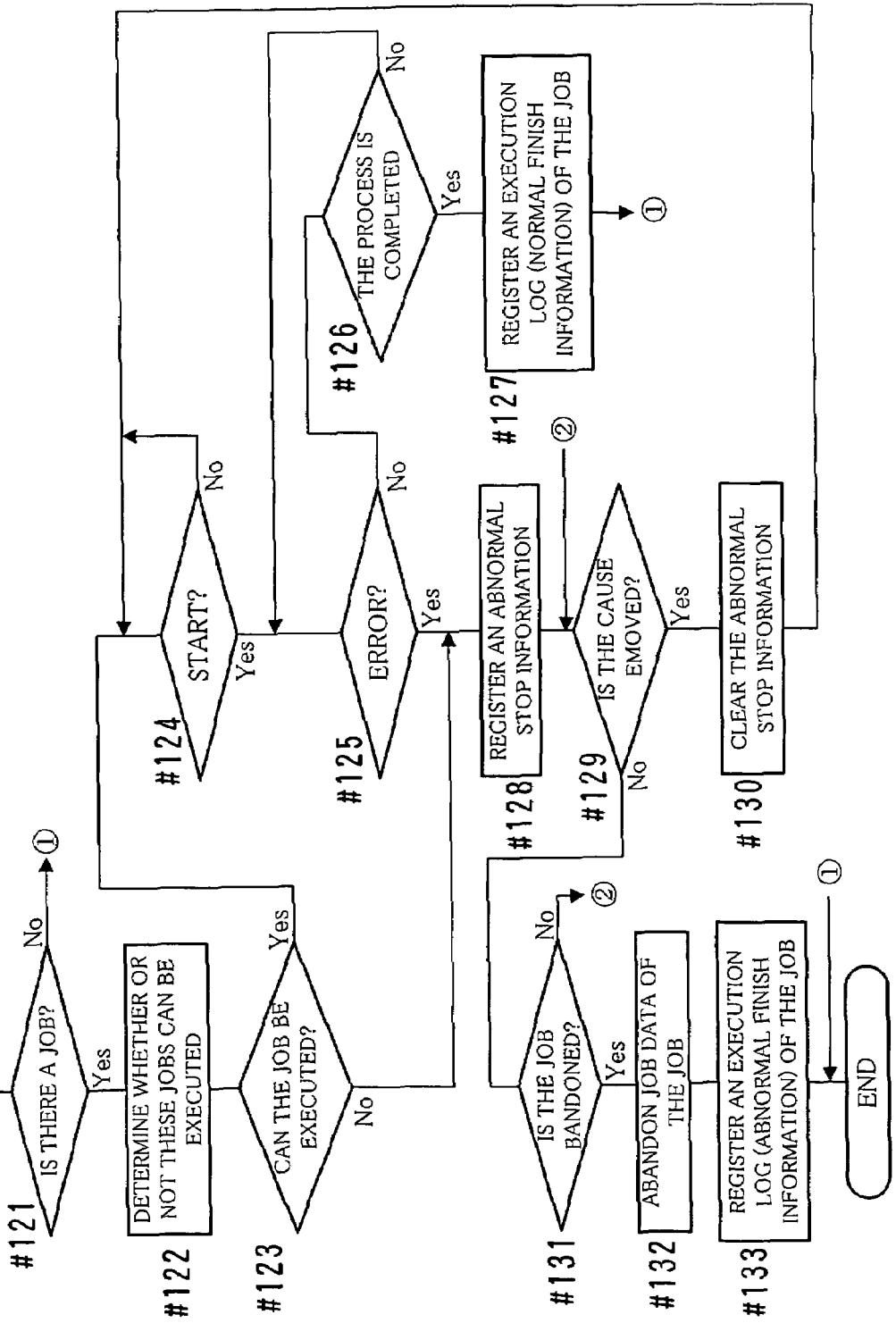
FIG. 14 is a flowchart showing an example of a flow of a job execution process.

FIG. 5 shows an example of a user information database DB1, FIG. 6 shows an example of a job reception table DB2, FIG. 7 shows an example of a job execution history table DB3, FIG. 8 is a flowchart showing an example of a flow of a user authentication process, FIG. 9 shows an example of a log-in screen HG1, FIG. 10 shows an example of a copy job reception screen HG2, FIG. 11 shows an example of an application copy setting screen HG3, FIG. 12 shows an example of a alternate sort, FIG. 13 is a flowchart showing an example of a flow of a job reception process, and FIG. 14 is a flowchart showing an example of a flow of a job execution process.

Next, each process of each portion of the image forming device 1 shown in FIG. 4 will be described in detail. Note that the following functions (a)-(c) of this image forming device 1 are optional functions that can be extended afterward and are not installed as standard functions. The function (a) is a "broadcasting transmission function" for sending image data to plural terminal devices at one time. The function (b) is an "image rotation function" for rotating image data stored in the RAM 1b (see FIG. 2) by 90 degrees. The function (c) is a "confidential print function" for suspending a printing process when receiving a print (network printing) instruction from the terminal device 2 until the user operates the operation panel 1h of the image forming device 1 to enter a password.

The database management portion 10M shown in FIG. 4 stores and manages the user information database DB1, the job reception table DB2 and the job execution history table DB3.

The user information database DB1 stores information that includes user IDs (user accounts), passwords and electronic mail addresses for communication of users who can use the image forming device 1 as shown in FIG. 5.

The job reception table DB2 stores information about a reception state of a job to be executed in accordance with a user's instruction as shown in FIG. 6. The job execution history table DB3 stores information about a result of execution of the job as shown in FIG. 7. These information and timing for storing will be described later.

The general control portion 101 shown in FIG. 4 controls the entire of the image forming device 1 so that a basic process is executed. For example, it controls so that a predetermined screen is displayed at a predetermined timing, an operation by a user is accepted, and a job such as scanning, printing or data transmission is performed in accordance with the operation.

The error detection portion 103 detects whether or not an error occurred in hardware or software of the image forming device 1. Furthermore, it also detects whether or not a malfunction in communication with other devices has happened. The device structure detection portion 104 detects a structure of the image forming device 1 so as to detect a new function added to the image forming device 1.

The user authentication portion 102 performs authentication about whether or not a person who intends to use the image forming device 1 is a regular user. This authentication is performed in the procedure as shown in FIG. 8. If nobody is operating the image forming device 1 directly, the display device 1h1 displays the log-in screen HG1 as shown in FIG. 9. A user who wants to use the image forming device 1 operates the operating button unit 1h2 so as to enter his or her user ID and password. Then (Yes in #101 shown in FIG. 8), the general control portion 101 accepts the user ID and the password so as to instruct the user authentication portion 102 to perform the user authentication process.

The user authentication portion 102 extracts a record having a user ID of the same value as the entered user ID from the user information database DB1 shown in FIG. 5 (#102). Then, the entered password is verified with a password of the record (#103). If they are identical to one another (Yes in #104), it is authenticated that the user is a regular user (#105). If they are not identical (No in #104), it is determined that the user is an unauthorized user so that the authentication is not given to the user. If there is no record having a user ID of the same value as the entered user ID in the user information database DB1, the authentication is neither given to the user. The user who was not given the authentication cannot use the image forming device 1.

If the authentication of being a regular user is given, the user is permitted to use the image forming device 1. Namely, the user has logged in the image forming device 1. Then, the general control portion 101 makes the display device 1h1 display the copy job reception screen HG2 as shown in FIG. 10. The user can make the image forming device 1 execute a desired process by doing a predetermined operation.

For example, in order to copy an original, the original is set to a predetermined position of the scanner 1e. Then, the number of copies is entered in a text box, and a "start" button of the operating button unit 1h2 (see FIG. 3) is pressed.

If the user wants to perform an application copy, an "application" button on the copy job reception screen HG2 is pressed. Then, the general control portion 101 makes the display device 1h1 display the application copy setting screen HG3 as shown in FIG. 11. The user can set which application copy should be performed by operating buttons in this application copy setting screen HG3.

For example, in order to copy a double-sided original (an original including image on both sides) to single sides of sheet of paper, a "double-sided" button in an "original" column and a "single-sided" button in an "output" column are pressed for selection. In order to duplicate a single-sided original to a double-sided copy, the "single-sided" button in the "original" column and the "double-sided" button in the "output" are pressed for selection. In order to duplicate a plural number of copies and eject them with sorted in alternating orientation one by one copy (set) of the printed matter as shown in FIG. 12, a "sort" button is pressed and selected. If the user wants a booklet finish (a finish like a booklet, a pamphlet or a magazine in which the print matter is stapled at the center line), a "booklet" button is pressed and selected. After selecting as desired, a "set" button is pressed, the number of copies is designated in the copy job reception screen HG2 again, and a "start" button of the operating button unit 1h2 is pressed.

If the user wants to scan an image of an original, the user presses a "scan" button on the log-in screen HG1. Then, the screen displayed on the display device 1h1 is changed from the copy job reception screen HG2 to a screen for designating an execution condition of a scanning process. Here, the user designates a transmission destination of the image data obtained by the scanning process and presses the "start" button of the operating button unit 1h2. If the user wants to do the fax transmission of an image of an original, a "fax" button is pressed. Then, a screen for designating an execution condition of the fax transmission is displayed, on which the user designates a transmission destination of fax data and presses the "start" button of the operating button unit 1h2.

By this operation, the user can give the instruction for performing a desired process to the image forming device 1.

In addition, the user can use the terminal device 2 for giving an instruction to the image forming device 1 from a remote place. In this case, a screen similar to the log-in screen HG1 shown in FIG. 9 is displayed on the terminal device 2 so that the user can enter his or her user ID and password by operating a keyboard or a mouse. Then, similarly to the case where the image forming device 1 is operated directly, the entered user ID and password are accepted by the image forming device 1 for executing the user authentication process.

The user of the terminal device 2 can use the image forming device 1 after getting the authentication to log in the image forming device 1. For example, the user can make the image forming device 1 execute the printing process (network printing) of an original created by word processing software or drawing software in the terminal device 2. In this case, the user can protect confidential of his or her original and enhance security thereof by designating use of the above-mentioned confidential print function as a condition of the printing process.

The image forming device 1 executes the process for accepting the instruction from the user, i.e., the instruction to execute the job in the procedure as shown in FIG. 13.

The general control portion 101 shown in FIG. 4 receives an instruction from a user (Yes in #111 shown in FIG. 13) and then determines whether or not the process can be executed in accordance with the instruction (#112).

For example, even though the functions (a)-(c) described above are not added to the image forming device 1, an instruction may be issued to execute a job that requires one of the functions. Then, it is determined that the job cannot be executed. Furthermore, even if there is a malfunction detected in hardware or software, an instruction may be issued to execute a job that requires one of them. In this case, too, it is determined that the job cannot be executed. If there is no specific malfunction, it is determined that the job can be executed.

If it is determined that the job can be executed (Yes in #112), job data of a job according to the instruction from the user is generated so that the job is registered in a job waiting queue (hereinafter referred to as a "queue" simply) (#113). Namely, a job that the user desired is accepted. If it is determined that the job cannot be executed (No in #112), instruction from the user is refused. Namely, acceptance of the job is refused (#114). In this case, the job is not registered in the queue.

In parallel with the process for registering in the queue, information about a result of acceptance for the job about the instruction of the user is registered in the job reception table DB2 shown in FIG. 6 (#115). In the job reception table DB2, one record corresponds to one instruction (job).

The "job ID" is ID information for identifying the job. The "user ID" indicates a user ID of the user who issued the instruction of the job. The "application" indicates an application that is used for executing the job or a type of the job. The "job reception state" indicates whether or not the job is accepted. The "reception refusal cause" indicates a cause of having refused the reception of the job.

The general control portion 101 executes job registered in the queue one by one. During the period from registration of the job in the queue until completion of executing the job, a malfunction can occur in the image forming device 1, the communication line 3 or another device that is linked for executing the job. In order to deal with such a malfunction, the image forming device 1 executes a process about execution of a job in the procedure shown in FIG. 14.

If there are jobs waiting in the queue (Yes in #121 shown in FIG. 14), it is determined whether or not these jobs can be executed at present by comparing a result of detecting an error by the error detection portion 103 with a type of each job or the execution condition (#122). For example, if an error of a photoconductor drum (such that it has reached the end of its life) is detected and a type of the job is "copy", it is determined that the job cannot be executed.

If it is determined that the job can be executed (Yes in #123), the job at the first place in the queue is executed (Yes in #124). Then, if the process is completed in success without any malfunction such as an error during the execution (No in #125, Yes in #126), an execution history (log) of the job is registered in the job execution history table DB3 shown in FIG. 7 (#127).

In the job execution history table DB3, one record corresponds to one job. The "job ID" is ID information of the job, and the "user ID" is a user ID of a user who instructed the job. The "application" indicates a type of the job. The "execution result" indicates either that a process of the job is finished normally in accordance with the user's instruction or that the process is not finished normally (namely, it is finished abnormally). The "abnormal finish cause" indicates a cause of the abnormal finish of the job.

If it is determined that the job cannot be executed (No in #123), abnormal stop information (information indicating that the execution is temporarily postponed or suspended) is written in job data of the job in the queue (#128), and execution of the job is postponed. There is a case where the process has to be suspended on its way after its execution has started, due to a malfunction such as an error. In this case (Yes in #124, Yes in #125) too, abnormal stop information is written in job data of the job, and execution of the job is suspended.

During the execution of the job is postponed or suspended, if other jobs are registered in the queue, the jobs are executed one by one in accordance with the procedure of this flowchart. Concerning the postponed or suspended job, it is waited for removal of cause of the postponed or suspended state. When the cause is removed (Yes in #129), the abnormal stop information of the job is removed so that the execution of the job is started or resumed (Yes in #124). If the cause is not removed after a predetermined time (No in #129), an error message is sent to the user who instructed the job, and the user is inquired whether the job can be abandoned or not. If an answer that indicates the job can be abandoned is obtained (Yes in #131), job data of the job is abandoned (deleted) from the queue so the execution is stopped (#132), and the execution history of the job is registered in the job execution history table DB3 shown in FIG. 7 (#133). On this occasion, "1: abnormal finish" is stored in the "execution result", and information indicating a cause that the job could not be completed is stored in "abnormal finish cause".

Figure 15:
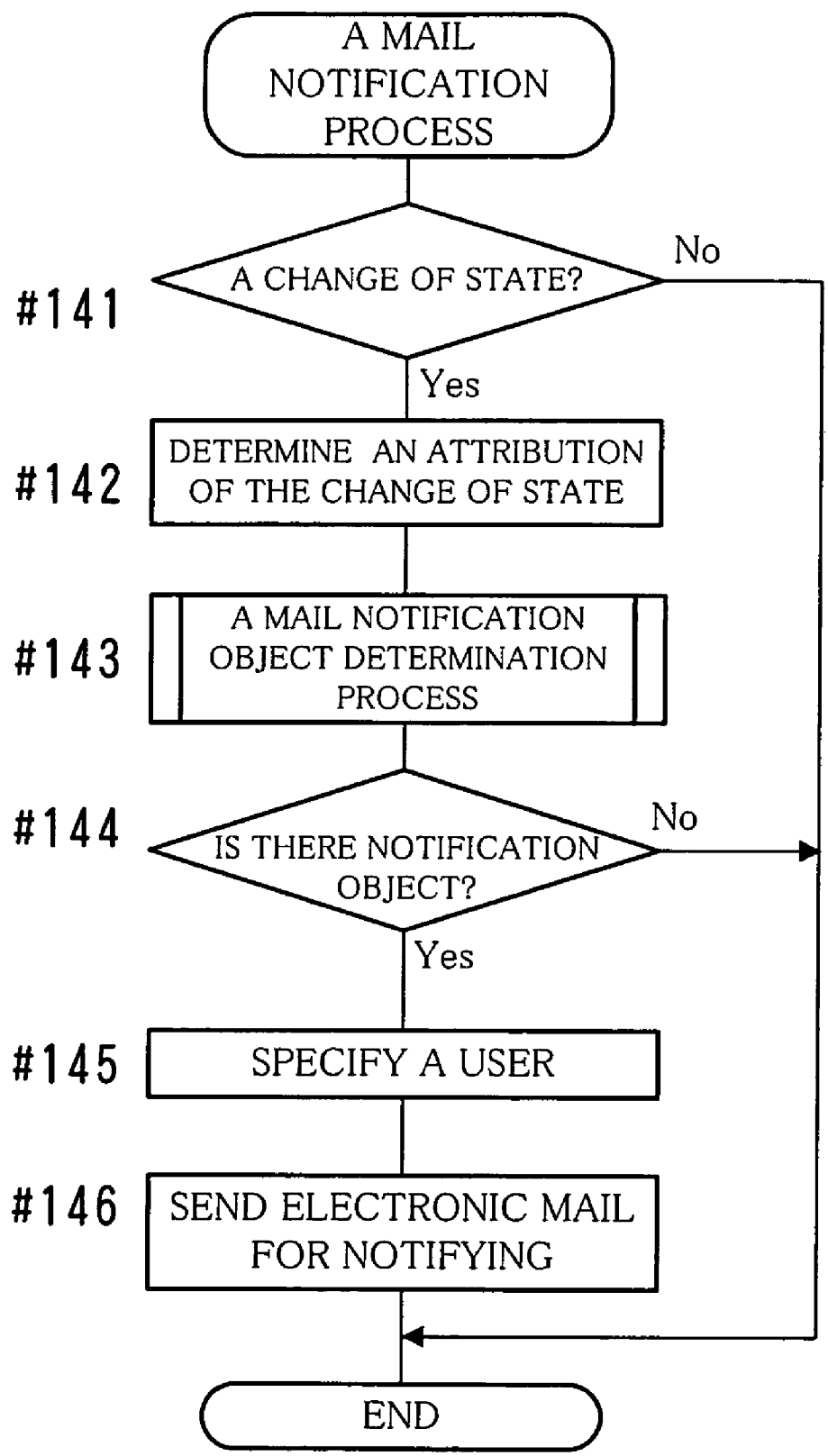
FIG. 15 is a flowchart showing an example of a flow of a mail notification process.
Figure 16:
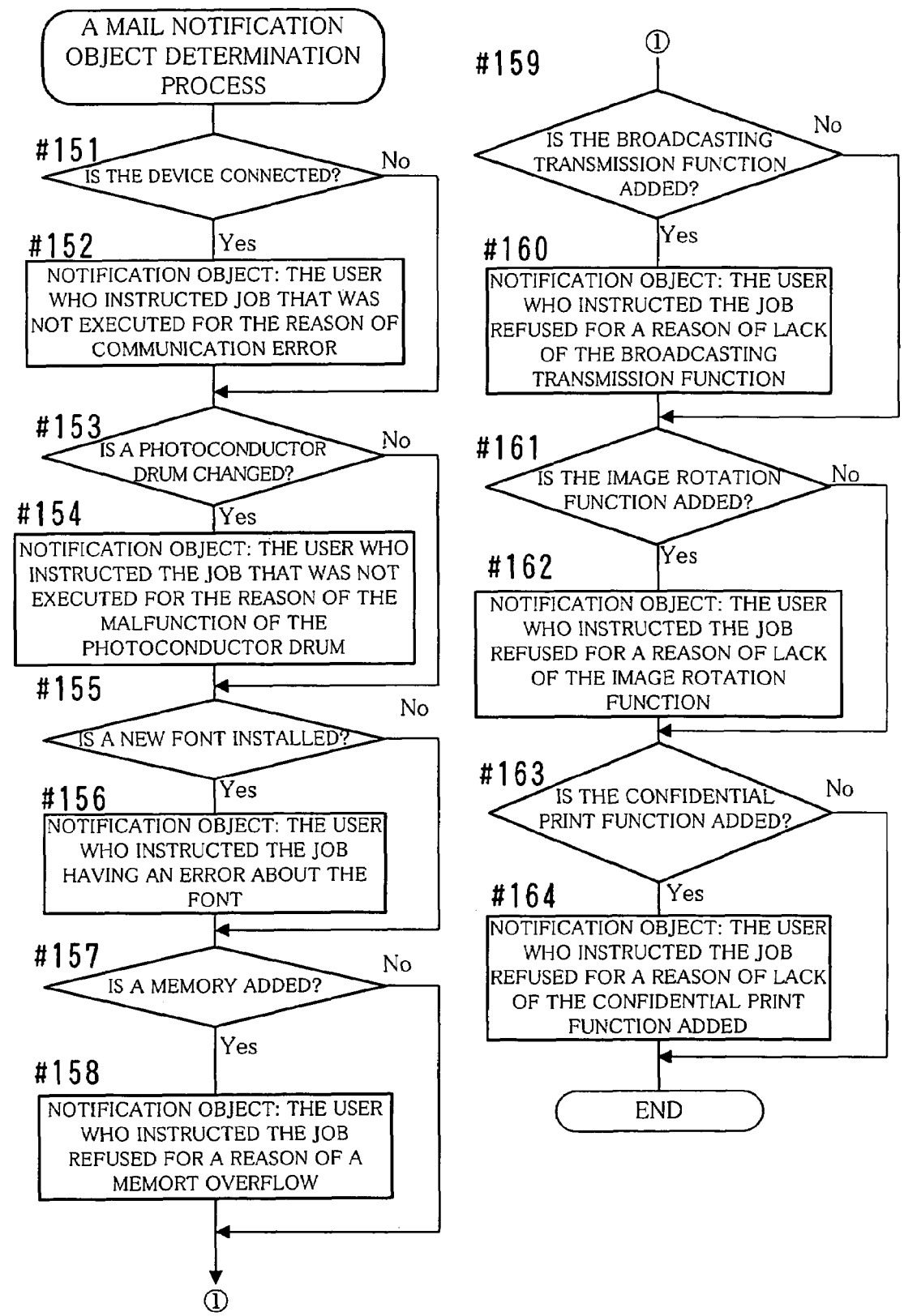
FIG. 16 is a flowchart showing an example of a flow of a mail notification object determination process.

FIG. 15 is a flowchart showing an example of a flow of a mail notification process, and FIG. 16 is a flowchart showing an example of a flow of a mail notification object determination process.

With reference to FIG. 4 again, when the error detection portion 103 detects that the cause of the error was removed or when the device structure detection portion 104 detects that new function is added to the image forming device 1, the notification object determination portion 105 determines the job that has become able to be executed due to the removal of the cause of the error or the addition of the new function among jobs having the job reception state of "1: reception refusal" registered in the job reception table DB2 shown in FIG. 6, and notifies the user who instructed the job that the execution becomes possible. Similarly, it determined the job that has become able to be executed due to the removal of the cause of the error or the addition of the new function among jobs having the execution result of "1: abnormal finish" registered in the job execution history table DB3 shown in FIG. 7. Then, the error cause removal notification portion 106 notifies the user who instructed the job. These processes are executed in the procedure shown in FIG. 15.

When the image forming device 1 detects a change of state (Yes in #141 shown in FIG. 15), an attribution of the change of state is determined (#142). Namely, it is determined which error has resolved or which new function is added.

In accordance with a result of the determination, it is determined what type of user should be notified that the job has become able to be executed (#143). This determination process is performed in the procedure as shown in FIG. 16. If it is determined that the communication with the device becomes possible as the result of Step #142 (Yes in #151 shown in FIG. 16), it is determined that the user, who instructed job that was not accepted in Step #114 shown in FIG. 13 or was stopped to be executed in Step #132 shown in FIG. 14 for the reason of having tried to communicate with the device, is the user who should be notified that the job has become able to be executed (#152). Note that the unable communication can be caused by a malfunction of a device of the party on the other end of the communication, an unknown address, a malfunction of the communication line 3, or a malfunction of network interface 1g or software of the image forming device 1.

When it is determined that the malfunction of the photoconductor drum has been resolved (Yes in #153), it is determined that the user who instructed the job that was not accepted or was stopped to be executed for the reason of the malfunction of the photoconductor drum is the user who should be notified (#154). If it is determined that a new font is installed (Yes in #155), it is determined that the user who instructed the job that was not accepted or was stopped to be executed for the reason of designation of the font as a font to be used for printing a document is the user who should be notified (#156).

If it is determined that a vacant area of the RAM 1b has becomes over a predetermined value by deletion of image data that has already been processed or if it is determined that a memory is added (Yes in #157), it is determined that the user who instructed the job that was not accepted or was stopped to be executed for the reason of a memory overflow error, i.e., an insufficient memory is the user who should be notified (#158). Note that the insufficient memory is often caused in the case of a job that requires loading all data of an original to be processed onto the memory such as printing with the booklet finish.

If it is determined that the broadcasting transmission function is added (Yes in #159), it is determined that the user who instructed the job that was not accepted or was stopped to be executed for the reason of having tried to use the broadcasting transmission function (i.e., designation of plural transmission destinations) despite of lack of the broadcasting transmission function is the user who should be notified (#160).

If it is determined that the image rotation function is added (Yes in #161), it is determined that the user who instructed the job that was not accepted or was stopped to be executed for the reason of having tried to use the broadcasting transmission function despite of lack of the image rotation function (for example, designation of the alternate sort as shown in FIG. 12) is the user who should be notified (#162).

If it is determined that the confidential print function is added (Yes in #163), it is determined that the user who instructed the job that was not accepted or was stopped to be executed for the reason of having tried to use the confidential print function despite of lack of the confidential print function is the user who should be notified (#164).

With reference to FIG. 15 again, when it is determined which user should be notified that the job has become able to be executed (Yes in #144), the user who are identical to the result of the determination are extracted from the job reception table DB2 (see FIG. 6) and the job execution history table DB3 (see FIG. 7) so as to specify the user to be notified (#145).

For example, if the communication with the terminal device 2A becomes possible, it is determined that the user, who instructed the job that was not accepted or was stopped to be executed when trying to communicate with the terminal device 2A by the process in Step #143 as shown in FIG. 16, is determined to be the user who should be notified. Therefore, the user who instructed the job having the job ID of "J006", i.e., the user having the user ID of "101" is extracted from the job execution history table DB3 and is specified as the destination of the notification. If the broadcasting transmission function is added, the user who instructed the job having the job ID of "J004", i.e., the user having the user ID of "105" is extracted from the job reception table DB2 and is specified as the destination of the notification.

Then, the error cause removal notification portion 106 sends electronic mail for notifying that the job has become able to be executed to the destination that is the electronic mail address of the specified user (#146). Note that the electronic mail may include information that indicates how the state has changed and which type or contents of job becomes able to be executed.

Figure 17:
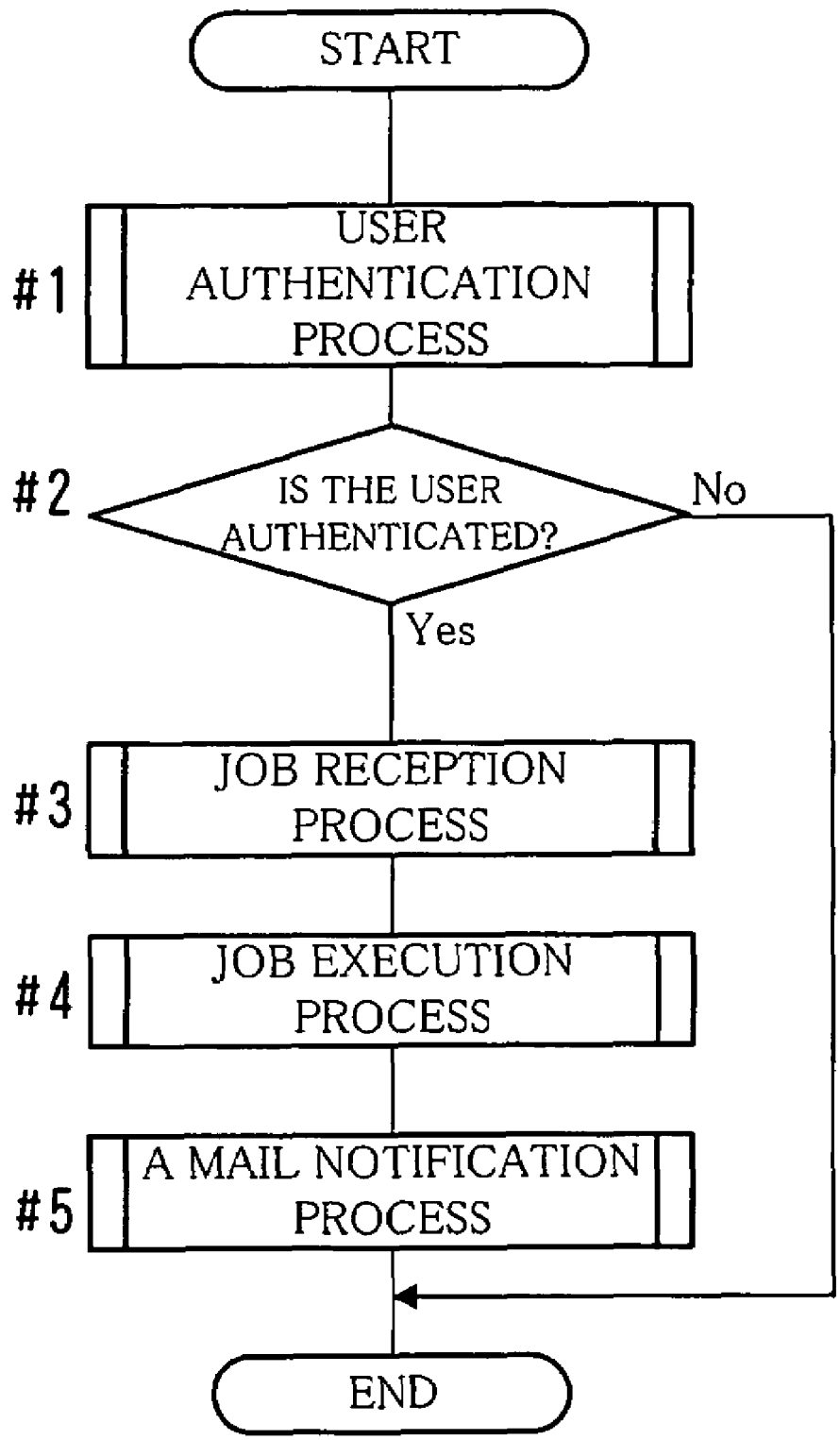
FIG. 17 is a flowchart showing an example of a flow of a general process of the image forming device.

FIG. 17 is a flowchart showing an example of a flow of a general process of the image forming device 1. Next, a flow of a general process of an image forming device 1 concerning reception and execution of the job will be described with reference to the flowchart shown in FIG. 17.

A user who wants to use the image forming device 1 first enters his or her user ID and password by operating the operation panel 1h or the terminal device 2. Then, the image forming device 1 performs the user authentication in accordance with the entered user ID and password (#1). The procedure of the process of the user authentication is the same as described above with reference to FIG. 8.

When receiving the authentication of being a regular user (Yes in #2), the user operates the operation panel 1h or the terminal device 2 to instruct the image forming device 1 to execute a desired process (job). Then, the image forming device 1 executes a process for accepting the instruction for the job (#3). The accepted job is registered in a queue. In addition, a result of the reception is registered in the job reception table DB2 shown in FIG. 6. The detailed procedure of the reception process is the same as described above with reference to FIG. 13.

In parallel with the process in Steps #1-#3, jobs registered in the queue are executed one by one (#4). A result of whether or not the process is finished normally is registered in the job execution history table DB3 shown in FIG. 7. The detailed procedure of the job execution is the same as described above with reference to FIG. 14.

In parallel with the process in Step #1-#3 and Step #4, change of state in the image forming device 1 or the like is detected, and the job that has become able to be executed due to the change is extracted from jobs that were not accepted in Step #3 (jobs of "1: reception refusal" in the job reception table DB2) and jobs whose processes were not finished normally in Step #4 (jobs of "1: abnormal finish" in the job execution history table DB3). Then, the notice that the job has become able to be executed is sent to the user who instructed the job (#5). The detailed procedure of the process is the same as described above with reference to FIGS. 15 and 16.

The user who received the notification from the image forming device 1 can instruct the image forming device 1 again to execute the desired job.

According to this embodiment, the user can be notified of timing of retrying the job that was not accepted or was stopped to be executed in a clear manner.

Although if there is a memory overflow error in a job, information of "4: memory overflow" is stored in the job execution history table DB3 shown in FIG. 7 as the abnormal finish cause of the job in this embodiment, it is possible to store information together that indicates what quantity of memory is shortage. Then, in Step #158 shown in FIG. 16, it is possible to determine that the user who instructed the job whose shortage quantity of memory shown in the abnormal finish cause exceeded the value of vacant memory area is the user who should be notified that the job has become able to be executed.

Although examples where the broadcasting transmission function, the image rotation function and the confidential print function are added respectively are described in this embodiment, the present invention can be applied to a case where other function is added. For example, a function for supporting a new file format is added, it is possible to notify the user who instructed the job that was not accepted or was abandoned due to designation of the file format before that the function has been added and the job has become able to be executed. If a capacity available to each user has increased due to increase of storage capacity in an external mail server or the like, it is possible to notify the user who designated the mail server for sending data of a scanned image or the like but the job was not accepted or was abandoned due to excessive capacity that the condition of the capacity has been relieved.

Although the notification to the user is performed by sending electronic mail to the electronic mail address of the user in this embodiment, this should not be understood as a limitation. For example, it is possible to perform the notification by displaying a message on the display device 1h1 when the user to be notified logs in the image forming device 1. It is also possible to perform the notification by sending a message by fax to other MFP placed near the user. The MFP placed near the user can be searched as follows, for example. Usually, in an organization such as a company, devices placed in the same group belong to the same sub network. Therefore, an MFP that belongs to the same sub network as the terminal device 2 can be searched by comparing an IP address and a sub net mask of the terminal device 2 of the user with an IP address and a sub net mask of each MFP. Alternatively, it is possible to register an MFP that is placed near each user is registered in a database and to search by using the database.

Furthermore, the structure of the entire or a part of the image forming device 1, the process contents, the process order, the process condition of the job, the structure of the database, and the method of determining a transmission destination can be modified if necessary in accordance with the spirit of the present invention.

The present invention can be used eligibly in an image processor, especially in an MFP that is used by many people.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A job execution device for executing a job for a predetermined process in accordance with an instruction given by a user, the job execution device comprising:
   a storage portion for storing a cause information that indicates a cause for which a job could not be executed normally and user ID information of the user who instructed the job, for each job;
   a determining portion for determining the job that could not be executed normally due to the cause in accordance with the cause information stored in the storage portion when it is detected that the cause is removed; and
   a notifying portion for notifying the user indicated in the user ID information corresponding to the determined job that the cause of the job has been removed.

2. The job execution device according to claim 1, wherein the job that could not be executed normally is a job for which the instruction was refused for a reason that the execution is unable when the instruction for the job was given.

3. The job execution device according to claim 1, wherein the job that could not be executed normally is a job that was abandoned because it was detected that the execution could not be completed before or during the execution although the job had been registered in a queue.

4. The job execution device according to claim 1, further comprising a detecting portion for detecting a cause that can be removed when a new function is added to the job execution device, wherein the determining portion performs the determination in accordance with a result of detection by the detecting portion.

5. The job execution device according to claim 1, wherein the cause information and the user ID information stored in the storage portion are histories thereof, and the determination of the job that could not be executed normally is based on the history of the cause information.

6. An image forming device for executing a job of a process about input or output of an image in accordance with an instruction given by a user, the image forming device comprising:
   a storage portion for storing malfunction cause information that indicates a cause of a malfunction and user ID information that indicates the user who instructed the job for each job that could not executed because the malfunction had happened;
   a detecting portion for detecting which cause of the malfunction was removed by detecting a change of state in the image forming device;
   a determining portion for determining the job that could not be executed normally due to the malfunction in accordance with the malfunction cause information stored in the storage portion when it is detected that the cause of the malfunction is removed; and
   a notifying portion for notifying a user indicated in the user ID information corresponding to the determined job that the cause of the malfunction was removed.

7. The image forming device according to claim 6, wherein if the detecting portion detects that a vacant area of a memory in the image forming device becomes over a predetermined value, the determining portion determines the job whose lack of memory is indicated in the malfunction cause information as the job that could not be executed normally.

8. The image forming device according to claim 6, wherein if the detecting portion detects another device that has become able to communicate with the image forming device, the determining portion determines the job whose unable state of communicating with the other device is indicated in the malfunction cause information as the job that could not be executed normally.

9. The image forming device according to claim 6, wherein if the detecting portion detects that a new font is installed in the image forming device, the determining portion determines the job for which the malfunction cause information indicates that the font is designated as a font for output as the job that could not be executed normally.

10. The image forming device according to claim 6, wherein the malfunction cause information and the user ID information stored in the storage portion are histories thereof, and the determination of the job that could not be executed normally is based on the history of the malfunction cause information.

11. An image forming device for executing a job of a process about input or output of an image in accordance with an instruction given by a user, the image forming device comprising:
 a storage portion for storing a cause information that indicates a cause for which a job could not be executed normally and user ID information of the user who instructed the job, for each job;
 a determining portion for determining the job whose unable state of the function is indicated in the cause information when it is determined that a function was added to the image forming device; and
 a notifying portion for notifying a user indicated in the user ID information corresponding to the determined job that the cause of the job has been removed.

12. The image forming device according to claim 11, wherein the cause information and the user ID information stored in the storage portion are histories thereof, and the determination of the job that could not be executed normally is based on the history of the cause information.

13. A method for controlling a job execution device that executes a job for a predetermined process in accordance with an instruction given by a user, the method comprising the steps of:
 storing cause information that indicates a cause for which a job could not be executed normally and user ID information of the user who instructed the job in a storage portion every time when the job is generated;
 determining the job that could not be executed normally due to the cause in accordance with the cause information stored in the storage portion when it is detected that the cause is removed; and
 notifying the user indicated in the user ID information corresponding to the determined job that the cause of the job has been removed.

14. The method according to claim 13, wherein the job that could not be executed normally is a job for which the instruction was refused for a reason that the execution is unable when the instruction for the job was given.

15. The method according to claim 13, wherein the job that could not be executed normally is a job that was abandoned because it was detected that the execution could not be completed before or during the execution although the job had been registered in a queue.

16. The method according to claim 13, wherein a cause that can be removed when a new function is added to the job execution device is detected, and the determination is executed in accordance with a result of detection.

17. The method according to claim 13, wherein the cause information and the user ID information stored in the storage portion are histories thereof, and the determination of the job that could not be executed normally is based on the history of the cause information.

18. A computer program product stored on a computer readable medium for use in a computer that executes a job for a predetermined process in accordance with an instruction given by a user, the computer program product makes the computer execute a process comprising:
 a first step of storing a cause information that indicates a cause for which a job could not be executed normally and user ID information of the user who instructed the job in a storage portion every time when the job is generated;
 a second step of determining the job that could not be executed normally due to the cause in accordance with the cause information stored in the storage portion when it is detected that the cause is removed;
 and a third step of notifying the user indicated in the user ID information corresponding to the determined job that the cause of the job has been removed.

19. The computer program product according to claim 18, wherein the job that could not be executed normally is a job for which the instruction was refused for a reason that the execution is unable when the instruction for the job was given.

20. The computer program product according to claim 18, wherein the job that could not be executed normally is a job that was abandoned because it was detected that the execution could not be completed before or during the execution although the job had been registered in a queue.

21. The computer program product according to claim 18, further comprising a fourth step of detecting a cause that can be removed when a new function is added to the job execution device, wherein the second step is executed in accordance with a result of detection in the fourth step.

22. The computer program product according to claim 18, wherein the cause information and the user ID information stored in the storage portion are histories thereof, and the determination of the job that could not be executed normally is based on the history of the cause information.

* * * * *